UNITED STATES PATENT OFFICE

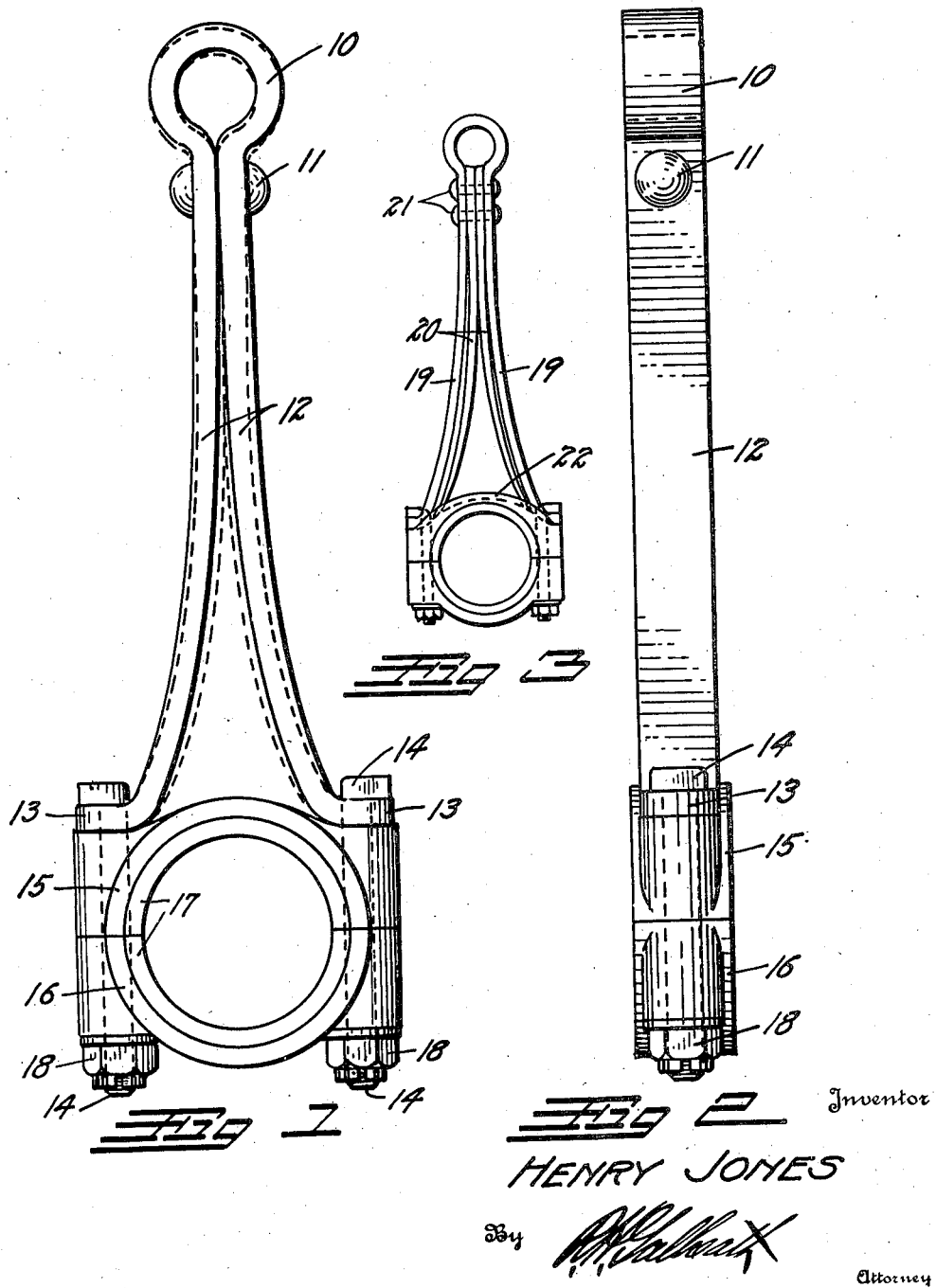

HENRY JONES, OF ANTIOCH, NEBRASKA

CONNECTING ROD FOR INTERNAL-COMBUSTION ENGINES

Application filed June 25, 1928. Serial No. 287,987.

This invention relates to a connecting rod for internal combustion engines and has for its principal object the provision of a resilient rod which will act to absorb and cushion the shock of the explosion so as to prevent knocking and hammering and to cause a more even pressure upon the crank shaft.

With the usual type of connecting rod the explosion shock is transmitted immediately and directly through the connecting rod to the crank shaft. This results in gradual damage to the bearings by hammering and creates lost motion or knocking in the engine. With the use of this invention the explosion shock is absorbed and stored in the rod and, as the pressure decreases, the rod will expand to its normal position so as to gradually transmit energy of the shock to the chank shaft.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side elevation of a connecting rod in which my invention is embodied.

Fig. 2 is an edge elevation of the same.

Fig. 3 is a side elevation illustrating an alternate form of the invention.

I prefer to form my connecting rod from an endless strip of spring steel which is shaped at its mid portion to form a wrist pin bearing 10. Immediately below the wrist pin bearing the strip is secured together by means of a rivet 11. In place of the rivet 11, any suitable joining means may be used, such as a bolt or the two parts of the strip may be welded together at this point. From the rivet 11 the two portions of the strip are flared outwardly to form a shank 12 for the rod.

The extremities of the strip have outwardly formed feet 13, drilled to receive crank bearing bolts 14. The bolts 14 secure a crank shaft bearing to the spring steel strip.

The crank shaft bearing comprises an upper bearing box 15 and a lower bearing box 16, both lined with babbitt or with any suitable bearing bushing 17. The bolts 14 are provided with lock nuts 18 which act to simultaneously clamp the two parts 15 and 16 of the bearing and the feet 13 of the resilient strip, together.

In use, an explosion in the engine will act downwardly on the wrist pin bearing 10, causing the rod to shorten as the two outwardly-flared portions of the shank 12 spring or bend inwardly, as indicated by the broken lines in Fig. 1. The greater the explosion pressure, of course, the further the portions will bend inwardly. As the driving pressure diminishes these portions will again spring outwardly acting to increase the length of the connecting rod and transmit the absorbed energy to the crank shaft.

In Fig. 3 I have illustrated an alternate form of the invention in which the shank is strengthened by additional springs. In this invention the shank proper comprises a strip of resilient material 19 similar to the previously described shank 12. The strip 19 is strengthened however, by additional spring leaves 20 secured thereto by means of rivets 21 or in any other desired manner. The lower extremities of the additional leaves 20 bear upon the top of the connecting rod bearing and slide therealong as they are compressed guided by side flanges 22 formed upon the bearing.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A connecting rod for internal combustion engines comprising: a crank shaft bearing; and an endless strip of resilient metal, said strip being bent back upon itself to form a wrist pin bearing, the extremities of said strip being outwardly flared to a connection with said crank shaft bearing.

2. A connecting rod for internal combustion engines comprising: a strip of resilient material; a cylindrical portion formed midway of said strip to receive the wrist pin of said engine; means for securing the two portions of said strip together adjacent said cylindrical portion; feet formed on the extremities of said strip, the strip between said cylindrical portion and said feet being spread apart; a crank shaft bearing; and means for securing said feet to said crank shaft bearing.

3. A connecting rod for connecting a crank shaft bearing with a wrist pin bearing comprising: two resilient legs extending from a spaced apart relation at said crank shaft bearing to contact with each other at said wrist pin bearing; and arranged to compress toward each other as said crank shaft bearing approaches said wrist pin bearing.

4. A connecting rod for connecting a crank shaft bearing with a wrist pin bearing comprising: two resilient legs extending from a spaced apart relation at said crank shaft bearing to contact with each other at said wrist pin bearing; and arranged to compress toward each other as said crank shaft bearing approaches said wrist pin bearing; and leaf springs secured between said legs and arranged to resist said approachment.

In testimony whereof, I affix my signature.

HENRY JONES.